United States Patent [19]

Cheung

[11] E Re. 31,353

[45] Reissued Aug. 23, 1983

[54] EXPANDING STRAP LOOP FORMING AND FRICTION FUSION MACHINE

[75] Inventor: Nelson Cheung, Arlington Heights, Ill.

[73] Assignee: Signode Corporation, Glenview, Ill.

[21] Appl. No.: 374,621

[22] Filed: May 3, 1982

Related U.S. Patent Documents

Reissue of:

[64] Patent No.: 4,062,278
Issued: Dec. 13, 1977
Appl. No.: 752,011
Filed: Dec. 20, 1976

[51] Int. Cl.[3] ..... B65B 13/02

[52] U.S. Cl. ..... 100/4; 53/589; 100/33 PB; 156/502; 156/580

[58] Field of Search ..... 100/4, 33 R, 2, 4, 6, 100/8, 26, 33 RB, 29, 32; 156/157, 580, 502; 2/321, 322; 53/589

[56] References Cited

U.S. PATENT DOCUMENTS

| | | | |
|---|---|---|---|
| 3,215,064 | 11/1965 | Koehler | 100/4 |
| 3,274,921 | 9/1966 | Mall | 100/4 |
| 3,438,063 | 4/1969 | Loston | 2/322 |
| 3,554,844 | 1/1971 | Ingram | 156/522 |
| 3,586,572 | 6/1971 | Ericsson | 156/359 |
| 3,636,861 | 1/1971 | Weller | 100/33 PB |
| 3,636,861 | 12/1977 | Cheung | 100/4 |
| 3,669,799 | 6/1972 | Vilcins | 100/33 PB |
| 3,946,659 | 3/1976 | Gutjahr | 100/4 |
| 4,154,158 | 5/1979 | Leslie | 100/4 |
| 4,154,963 | 3/1979 | Leslie | 100/4 |
| 4,313,779 | 2/1982 | Nix | 156/580 |

FOREIGN PATENT DOCUMENTS

| | | |
|---|---|---|
| 325301 | 9/1920 | Fed. Rep. of Germany . |
| 1153318 | 8/1963 | Fed. Rep. of Germany . |
| 1223747 | 3/1967 | Fed. Rep. of Germany . |
| 1225543 | 4/1967 | Fed. Rep. of Germany . |
| 2403261 | 7/1975 | Fed. Rep. of Germany . |
| 2403261 | 11/1977 | Fed. Rep. of Germany . |
| 44-13258 | 2/1969 | Japan . |
| 48-23150 | 2/1973 | Japan . |
| 388182 | 6/1965 | Switzerland . |
| 936718 | 9/1963 | United Kingdom . |
| 1212385 | 11/1970 | United Kingdom . |

*Primary Examiner*—John M. Jillions
*Attorney, Agent, or Firm*—Dressler, Goldsmith, Shore, Sutker & Milnamow, Ltd.

[57] ABSTRACT

An automatic strapping apparatus is disclosed which forms a small primary loop from strap; expands the primary loop to a larger predetermined diameter loop which can be placed about a package to be strapped; and tensions, friction fuses, and severs the strap. The small primary strap loop is formed by feeding a free end of a length of strap into a circular cup through a slot in the cup sidewall so that the free end is guided by the inner periphery of the cup to form a loop with the strap free end overlapping a portion of the loop. The cup is moveable from an upper position around the formed primary loop to a position out of contact with, and below, the loop. A cylindrical gripper is provided inside the loop and a smooth-surfaced anvil is provided on the exterior of the loop for engaging the overlapped portion of the loop therebetween so that the strap free end is restrained by the gripper while the overlapped portion of the loop can be continued to be fed to expand the loop to a larger predetermined diameter. The strap free end remains restrained by the gripper as the strap is tensioned to tighten the loop about the package. The gripper is then rotatably oscillated at a high frequency to cause the strap free end to slide against the overlapped portion of the loop thereby generating heat and fusing the strap free end to the overlapped portion of the strap loop. A cutter is provided to sever the tightened and fused loop from the standing length of strap.

14 Claims, 14 Drawing Figures

20
22
62
28
26
60
52

24
22
62
28
26
52

20
120
114
122
46
62
104
110
108
44
52
28
112
102
83
100
42
60
68
70
64
92
66
86
88
40
72
76
53
26
82
80
78
74

90
62
104
100
88
42
46
8.
83
84
86
98
96
102
92
48
36
44
40
34
56
106
97
36
94
38
34
53
60
52
26
28
8.

CUP SOLENOID ACTUATOR
66
144
STRAP FEED SWITCH
74
TRACTION WHEEL INCREMENTAL CONTROL UNIT
154
TIMER
76
TRACTION WHEEL MOTOR
132
LOW PRESSURE AIR SOLENOID VALVE
156
TIMER
148
STRAP TENSION SWITCH
134
MEDIUM PRESSURE AIR SOLENOID VALVE
136
HIGH PRESSURE AIR SOLENOID VALVE
100
TENSION SENSING SWITCH
152
TIMER
80
WELD HEAD MOTOR

EXPANDING STRAP LOOP FORMING AND FRICTION FUSION MACHINE

Matter enclosed in heavy brackets [ ] appears in the original patent but forms no part of this reissue specification; matter printed in italics indicates the additions made by reissue.

BACKGROUND OF THE INVENTION

*This patent is related to U.S. Pat. No. 4,079,667 which is assigned to Signode Corporation, the assignee of this patent.*

In the recent past, Signode Corporation, the assignee of the entire interest of the present application, has developed several processes and tools for joining the overlapping end portions of a tensioned thermoplastic loop by friction-fusion techniques, and these methods and apparatuses are typified by those disclosed and claimed in the U.S. patent to Stensaker et al., U.S. Pat. No. 3,442,732; to Vilcins, U.S. Pat. No. 3,442,733; to Ericsson, U.S. Pat. No. 3,442,734; to Stensaker, U.S. Pat. No. 3,442,735; to Kobiella, U.S. Pat. No. 3,442,203; and to Ericsson, U.S. Pat. No. 3,586,572.

Some strapping machines, such as the machine disclosed in the Kobiella U.S. Pat. No. 3,442,203, are of the completely automatic type, i.e., one which automatically feeds a strap around a package from a strap supply source, grips the leading end of the strap, withdraws the standing length of the strap to tension the strap loop, friction-fuses the overlapping portions of the loop, and severs the loop from the standing length of the strap. However, this type of automatic strapping machine has a relatively large, ring-like, rigid chute into which the package is inserted and in which the strap is fed to form a closed loop around the package. With thermoplastic strap, problems have been encountered wherein the strap may buckle or jam in the chute as the strap is fed around the package. This is due to the relatively low column strength of the thermoplastic strap. In addition, a ring-like chute adds considerable bulk to the machine and requires a work space, or operating space, large enough to accommodate the chute and large enough to provide insertion and removal areas for the package.

It would be desirable to provide an automatic strapping machine which could form the strap loop without the need for a large, ring-like chute into which a package must be inserted. Further, such a machine could be made relatively small so that it could be used on a work table or desk for strapping small packages.

Automatic strapping machines which use ring-like strap chutes to form the loop about the package are somewhat inefficient with respect to strapping different size packages. For example, if a strapping machine is intended to strap large packages, say three feet in diameter, then the strap chute must be at least three feet in diameter. If, subsequently, the machine is used to strap much smaller packages, say one foot in diameter, then the strap loop formed around the smaller packages is initially three feet in diameter and the machine must withdraw a substantial amount of trailing strap during the tensioning process to decrease the diameter of the loop and tighten it about the one-foot diameter package. This is obviously inefficient. Therefore, it would be desirable to provide a strapping machine which could form a strap loop of any desired size. Such a machine would advantageously be used in strapping operations where the size of the packages would vary.

Thermoplastic strapping machines currently available also suffer from some drawbacks relating to the formation of the friction-fusion weld. In order to form a friction-fusion weld on the overlapped portion of the strap loop, an anvil or bearing member must be inserted between the package and the strap loop to provide a rigid bearing surface against which the overlapping strap portions are pressed by an oscillating weld member. The anvil member prevents the strap loop from lying flat against the surface of the package at that point and therefore introduces slack into the loop. However, owing to the flexibility of the strap, a tight loop can usually be obtained with large and slightly resilient packages. Unfortunately, though, with very small packages and/or with packages having relatively rigid, incompressible surfaces, the amount of slack introduced into the strap loop by the inserted anvil can be significant and can result in a loose strap loop when the anvil is retracted from between the strap and the package. Accordingly, it is desirable to provide a method and apparatus for welding the strap loop in a manner that does not require the insertion of an anvil member between the strap and the package.

SUMMARY OF THE INVENTION

The apparatus of the present invention utilizes a unique method for forming a strap loop which can be placed about a package. A supply of strap is threaded in guideways in a horizontal strap transport zone below a horizontal package support surface. The strap is further threaded between a traction wheel and an idler wheel, the traction wheel being driven by an electric motor to advance the strap forward when feeding the strap to form a loop and to withdraw the strap backwards when tensioning the loop.

A cylindrical cup is provided to receive the free end of the strap as it is fed forward. The strap enters the cup through an opening or slot in the cylindrical side of the cup and impinges upon the interior surface of the cup where the strap is further guided in a closed arcuate path to form a small primary strap loop with the free end overlapping a portion of the strap loop. The cup is mounted for movement between this first, strap receiving, position and a second position beneath the first position. After the strap loop has been formed, the cup is lowered to the second position and the formed primary strap loop, being supported by the standing length of strap in the strap transport zone guideways, remains suspended at the elevated first position above the lowered cup.

A combination cylindrical gripping/welding member extends through the bottom of the cylindrical cup and up into the inside of the formed primary strap loop. A moveable anvil member is provided on the exterior of the formed strap loop and is moveable toward and away from the combination gripping/welding member. When the cup has been moved to the lowered position below the formed primary strap loop, the anvil member is moved toward the gripping/welding member and presses the overlapped portion of the strap loop therebetween. The gripping/welding member has a rough peripheral gripping surface which engages a side of the strap free end while the anvil surface contacting the side of the overlapped portion of the loop is smooth. Thus, as the strap continues to be fed, the strap free end is restrained from movement and the overlapped portion of the loop slides between the strap free end and the smooth surface of the anvil to expand the loop to a larger diameter. When a predetermined larger diameter has been reached, the feeding of the strap is terminated.

A package, having been placed upon the raised package support surface adjacent the overlapped portion of the strap loop, is then moved forward to overhang the horizontally oriented loop. The operator then grasps the strap loop and lifts it around the package by twisting the loop about the restrained overlapping strap area to a vertical orientation about the package. Reversal of the traction wheel withdraws the standing portion of the length of strap to tighten the loop about the package. When the strap is tensioned to tighten the loop, the gripping/welding member is still engaged with the strap free end to prevent its movement and to allow the loop to be tightened.

As the loop is tightened about the package, the strap free end and the adjacent overlapped loop portion of the strap between the anvil member and the gripping-/welding member are oriented with their sides perpendicular to the bottom surface of the package and lying in the plane of the loop about the package. In this configuration, the strap loop is next friction-fusion welded in the overlapping area. The gripping/welding member is rotatably oscillated at a high frequency to move the strap free end back and forth relative to the overlapped portion of the strap loop thereby generating sufficient friction heat to fuse the strap free end to the overlapped portion of the loop. A cutter blade is provided to sever the standing length of strap from the loop. Next, as the anvil is retracted away from the gripping/welding member, the twisted, overlapped portion of the loop twists back to assume the normal orientation lying flat against the package. The package can then be removed from the apparatus.

BRIEF DESCRIPTION OF THE DRAWINGS

In the accompanying drawings forming part of the specification, and in which like numerals are employed to designate like parts throughout the same.

DESCRIPTION OF THE PREFERRED EMBODIMENT

Figure 1:
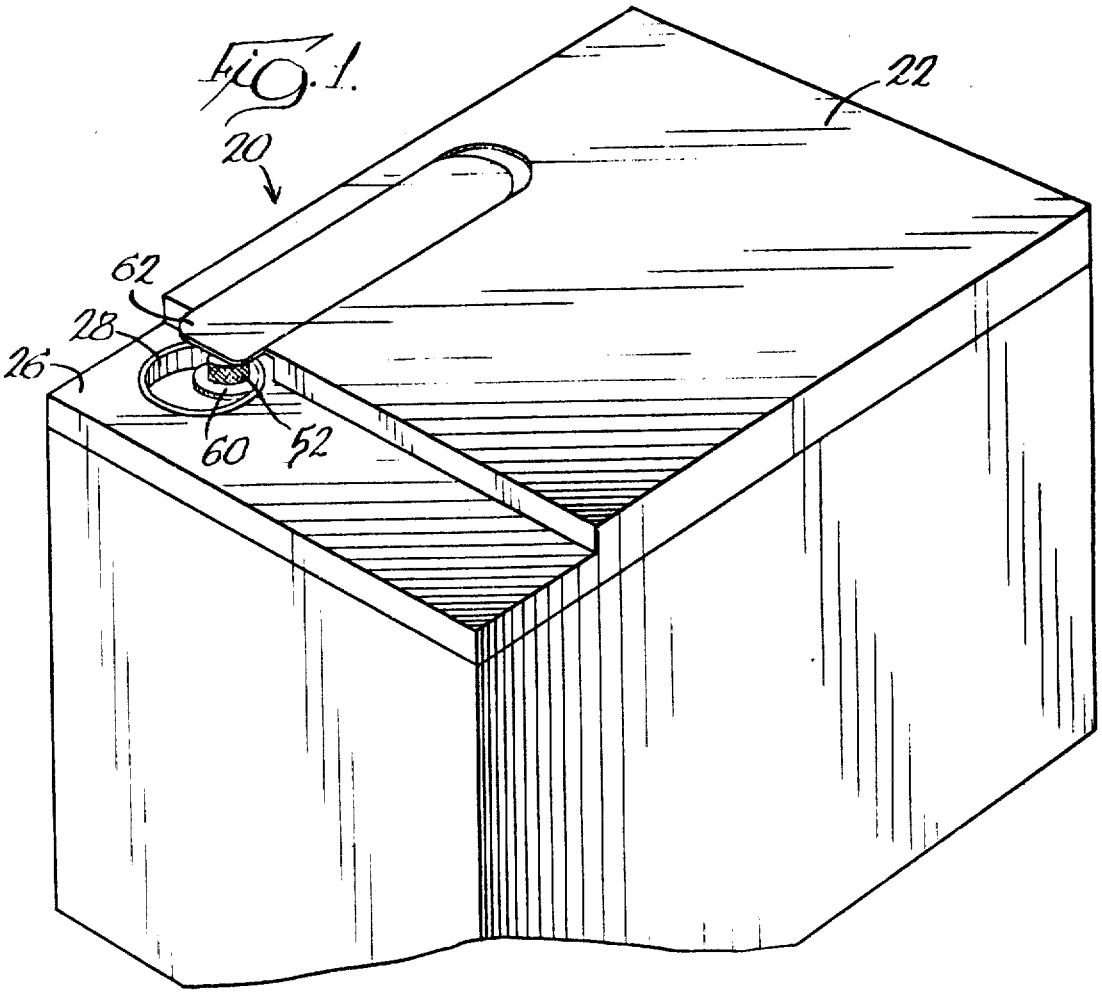
FIG. 1 is a partial perspective view of a preferred embodiment of the apparatus of the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

For ease of description, the apparatus of this invention will be described in normal operating position, and terms such as upper, lower, horizontal, etc., will be used with reference to this normal operating position. It will be understood, however, that apparatus of this invention may be manufactured, stored, transported, sold and used in orientation other than the normal operation position described.

The apparatus of this invention has certain conventional drive mechanisms and control mechanisms which, though not fully illustrated or described, will be apparent to those having skill in the art and understanding of the necessary functions of such drive mechanisms causing proper operation of the apparatus in the manner as will be explained.

A preferred embodiment of the expanding strap loop forming and friction fusion apparatus in accordance with the present invention is designated generally as 20 in FIG. 1. Preferably, the apparatus is of a size suitable for being placed on a worktable or desk and is advantageously used to strap rectangular parallelpiped-shaped packages having dimensions of between 5 and 40 inches on each side. However, the apparatus can accommodate much larger or smaller packages and packages of different shapes.

Figure 2:
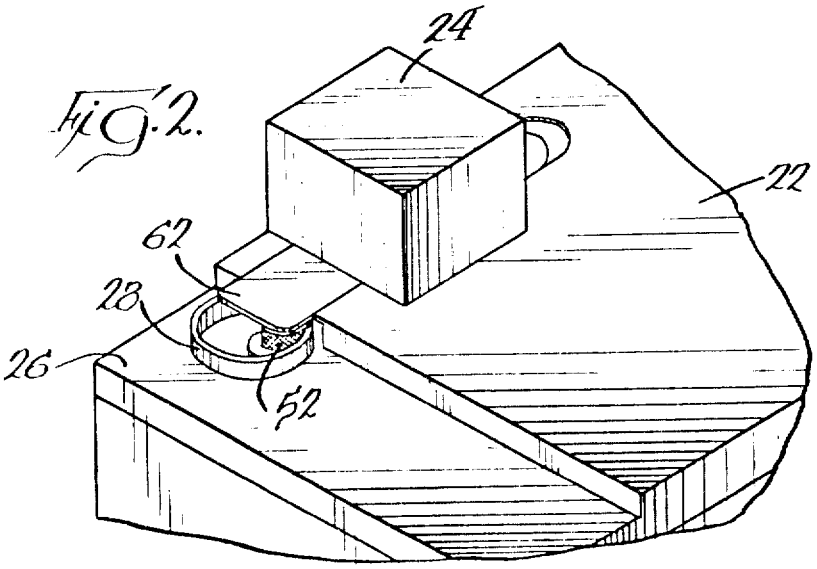
FIG. 2 is a partial perspective view similar to FIG. 1 and showing a package on the apparatus with the strap cup in raised position.

As shown in FIG. 2, the apparatus 20 of the present invention has a package support surface 22 for supporting a package 24. The apparatus 20 has a lower surface or shoulder 26 stepped below the elevation of the package support surface 22. [OUTLINE OF THE MAJOR STEPS OF THE STRAPPING SEQUENCE.]

*OUTLINE OF THE MAJOR STEPS OF THE STRAPPING SEQUENCE*

To aid in understanding the details of construction of the apparatus 20, a brief outline of the process of forming and securing a strap loop about a package will first be given.

Figure 3:
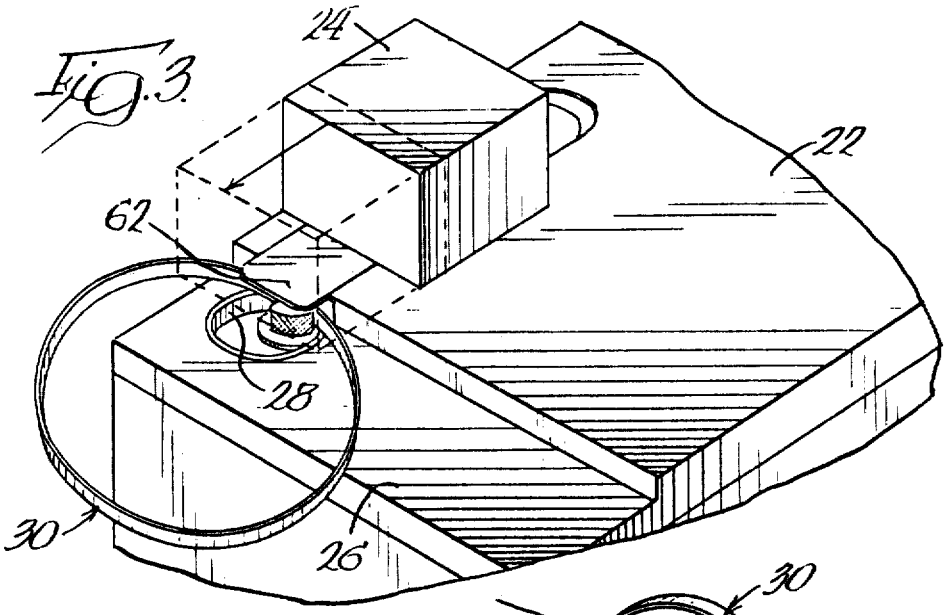
FIG. 3 is a partial perspective view similar to FIG. 2 showing the strap cup in the lowered position and the strap being expanded to a predetermined larger diameter.

As illustrated in FIG. 2, a package 24 is first placed upon the package support surface 22 near shoulder 26. A cylindrical cup 28 is raised from a position below the surface of shoulder 26 to an elevated position above the surface of shoulder 26. By a novel means, as will be described in detail hereinafter, a length of strap is fed into the cup to form a primary strap loop. The cup 28 is then lowered to a position below the surface of shoulder 26 while the loop is maintained at the higher elevation where it is expanded to a predetermined larger diameter loop 30 as illustrated in FIG. 3. Next, the operator slides the package 24 forward to overhang shoulder 26 and then places the expanded loop 30 about the package 24 as illustrated in FIG. [5] *4*. The strap is tensioned to draw the loop tight about the package. The entire process is completed when the tensioned loop is friction fusion welded to form a connection and then severed from the strap supply.

The specific features of the apparatus used to accomplish the above-described package strapping process will next be discussed in detail. The major features or mechanisms of the apparatus are: (1) the strap loop forming mechanism; (2) the strap feed and tensioning mechanism; (3) the strap loop friction fusion mechanism; (4) the strap severing mechanism; (5) the pneumatic actuation system, and (6) the electrical control system.

STRAP LOOP FORMING MECHANISM

A novel feature of the present invention is the mechanism automatically for first forming a primary strap loop that can be subsequently expanded to any larger size. The apparatus for forming the primary strap loop is most clearly shown in FIGS. 6 through 11.

Figure 7:
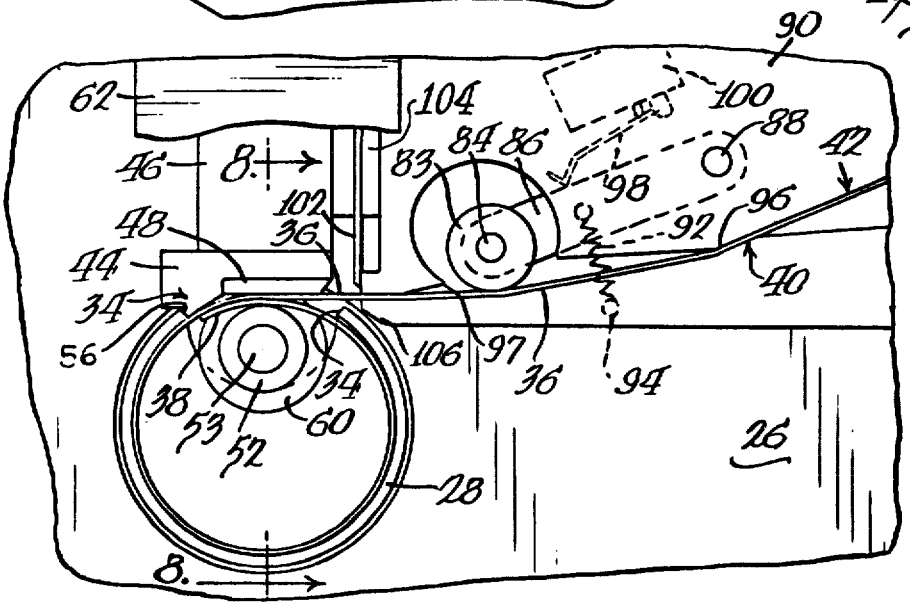
FIG. 7 is an enlarged, partial, fragmentary top view of the apparatus shown in FIG. 2 with the strap cup in raised position and a length of strap formed into a loop within the cup.

By a strap feed mechanism described hereinafter, the strap is fed into a guide means. A circular band member, or cup 28, provides a circular guide means for forming the primary strap loop. Cup 28 is a substantially cylindrical member and may or may not have open ends. In the preferred embodiment illustrated, cup 28 has a partially closed bottom and an open top. A portion of the vertical cylindrical wall of the cup 28 is cut away to form a relatively large opening or slot 34 for receiving a length of strap 36 as shown in FIG. 7. The cup 28 guides the strap free end 38 in a closed arcuate path whereby the free end 38 is directed back upon the length of strap 36 to form the initial primary strap loop with the free end of the strap overlapping a portion of the formed strap loop.

Figure 6:
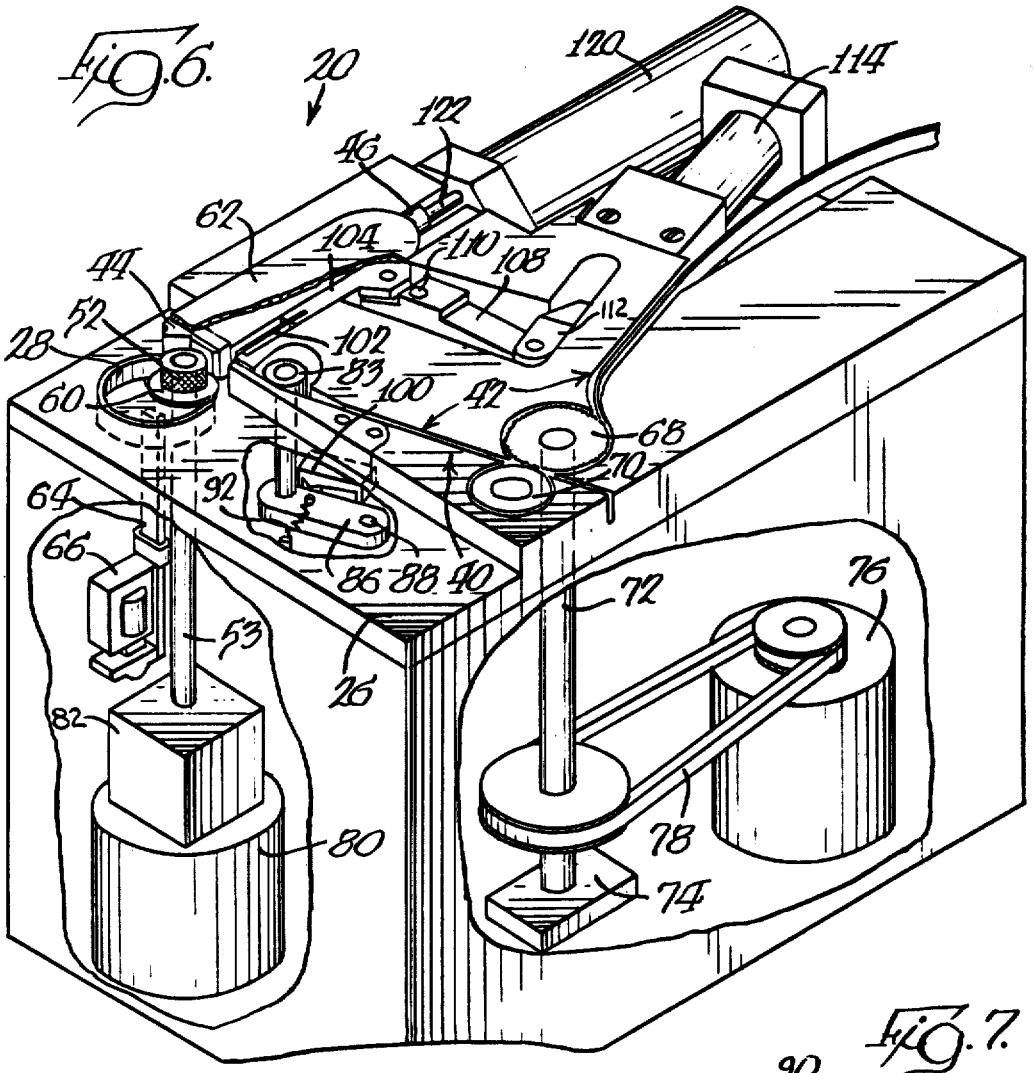
FIG. 6 is a partial fragmentary perspective view of the apparatus shown in FIG. 1.

The cup 28 is moveable between an upper, or raised position and a lowered position. The mechanism for raising and lowering the cup 28 may be of an appropriate type. As illustrated in FIG. 6, the cup 28 is secured to a drive member 64 which is attached to an electric solenoid actuator 66.

The length of strap 36 is oriented with it side surfaces perpendicular to the plane of the package support surface 22 and is guided beneath the package support surface 22 in a strap transport zone 40 which lies between the package support surface 22 and the plane of shoulder 26. The strap transport zone 40 has a thickness substantially equal to the width of the length of strap 36 and is essentially a stratum in which the length of strap 36 is fed, guided, formed into a primary loop, expanded into a larger loop, tensioned, friction welded and severed. In the raised position (as illustrated in FIG. 2), the cup 28 lies in the strap transport zone 40. In the lowered position, (as illustrated in FIG. 1 and FIG. 6), the cup 28 lies below the strap transport zone 40. The length of strap 36 is guided within the strap transport zone 40 by appropriate guideways 42 as illustrated in FIG. 6. The strap is also fed forward and tensioned backwards through the guideways 42 in zone 40 by appropriate traction drive means as will be described hereinafter.

Figure 8:
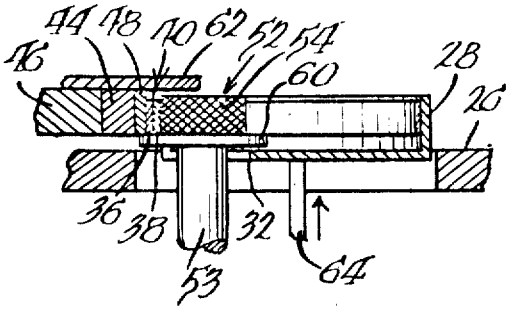
FIG. 8 is a sectional view taken generally along the plane 8—8 of FIG. 7.

During loop formation, the strap free end 38 is (1) guided into the cup slot 34, (2) maintained within the cup 28 by upper and lower guides, and (3) restrained above cup 28 during lowering of cup 28 and subsequent expansion of the loop. These guides and strap restraining means will be described with reference to FIG. 7. Adjacent slot 34 is an anvil 44 which is mounted on moveable slide 46. A portion of anvil 44 adjacent the length of strap 36 has a smooth-surfaced polyurethane pad 48 secured thereto for guiding and contacting length of strap 36 as will be described hereinafter. Opposite the polyurethane pad 48 is a cylindrical member, or weld head 52, which uniquely serves two functions: (1) gripping the strap free end 38 and (2) welding the free end to the overlapped portion of the loop. The welding function will be described later. At this point, just the gripping or restraining feature of the weld head will be discussed. The weld head 52 is mounted on shaft 53 and is a substantially cylindrical member having a rough, peripheral gripping surface 54 adapted for contacting a side of the strap free end 38. Both the weld head 52 and the anvil 44 lie in the strap transport zone 40 as illustrated in FIG. 8. The anvil 44 is moveable, by air cylinder actuator means to be described later, within the transport zone 40 in a horizontal plane towards and away from the weld head 52. When the cup 28 is in the raised position as illustrated in FIGS. 7 and 8, the anvil 44 can be moved towards the weld head 52 to a position spaced away from the weld head gripping surface 54 where a portion of the anvil 44 contacts the cup 28 at abutment surface 56 and remains biased thereagainst. In this position there is sufficient clearance between the weld head gripping surface 54 and the polyurethane pad 48 to allow the length of strap 36 and the overlapping free end 38 to lie therebetween. When the cup 28 is lowered below the surface of shoulder 26, the anvil 44, being biased towards the weld head 52, moves toward the weld head 52 to bring the polyurethane pad 48 into contact with the length of strap 36 lying therebetween to restrain the overlapping strap free end 38 from movement.

As illustrated in FIG. 6, the movement of anvil slide 46 is effected by a pneumatic cylinder actuator 120 which acts through a piston rod 122 connected on one end to the cylinder piston (not shown) and on the other end to the slide 46.

Referring now to FIG. 7, the detailed formation of the primary strap loop will now be described. First, the free end 38 of a length of strap 36 is fed forward in the strap transport zone 40 between the strap transport guideways 42 and through apertures 34 of cup 28. The strap free end 38 is guided by polyurethane pad 48 and a portion of anvil 44 as it enters the interior of cup 28. The strap free end 38 is guided by the interior surface of cup 28 in a closed arcuate path to form an initial primary loop with the free end 38 overlapping a portion of the loop between the anvil 44 and the weld head 52. By suitable control means as will hereinafter be described, the feeding of the strap length 36 is terminated when the primary loop has been formed essentially as illustrated in FIG. 7.

It is desirable during the primary loop formation stage, as well as during subsequent tensioning and welding stages, to maintain the overlapped portion of the strap length 36 and the free end 38 in the elevation of the strap transport zone 40. To this end, appropriate upper and lower guides are provided. A flange 60 is provided in the lower end of the weld head 52 for keeping the overlapped portion of the strap length 36 and strap free end 38 from running below weld head 52. A slide cover 62 is secured to, and moveable with, slide 46 above the strap transport zone 40 to prevent the overlapped portion of the length of strap 36 and the strap free end 38 from riding above the weld head 52 and the polyurethane pad 48.

After the primary strap loop has been formed, the cup 28 must be lowered from its elevated position in the strap transport zone 40 to a second position below the strap transport zone 40. As the cup is lowered, the formed primary strap loop does not ride in the cup 28 to the lowered position, but rather slides out of the cup and remains at the upper position. This is due to the combination of the relatively small diameter of the cup 28, the stiffness of the strap, the low coefficient of friction between the strap and the cup, and the fact that the strap length 36 is supported on its bottom edge in the strap transport zone guides 42. Consequently, when the cup 28 is lowered, the formed primary strap loop is maintained at the elevation of the strap transport zone 40 above the top surface of the shoulder 26.

After the cup 28 is completely lowered away from the primary strap loop, any tendency of the loop to uncoil or unwind is resisted. Owing to the proximity of the weld head 52 and the polyurethane pad 48 on opposite sides of the overlapping strap portions of the loop, the loop is not able to unwind and is thus maintained in a loop.

Figure 10:
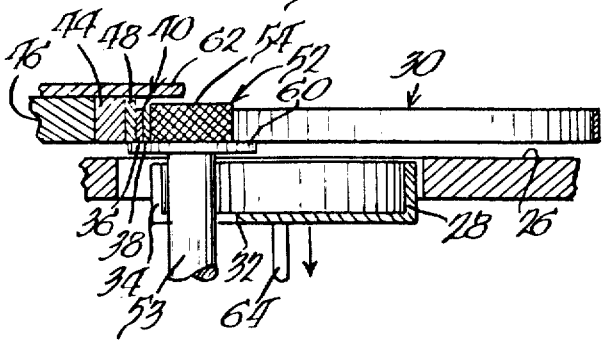
FIG. 10 is a sectional view taken generally along the plane 10—10 of FIG. 9.
Figure 9:
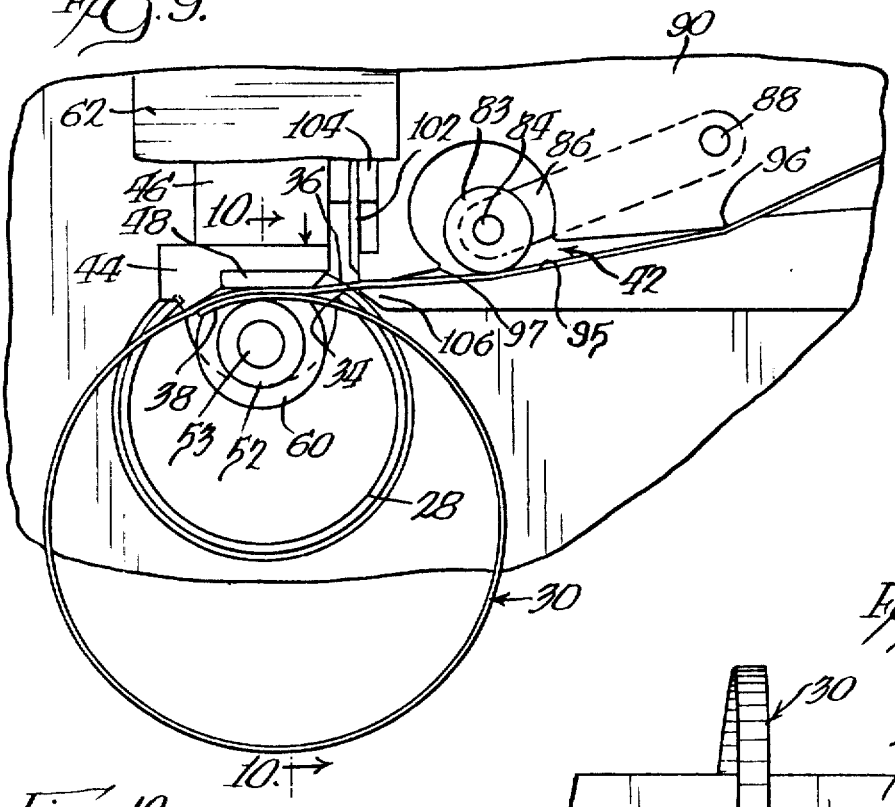
FIG. 9 is an enlarged, partial, fragmentary top view similar to FIG. 7 but with the strap cup in the lowered position and the strap loop expanded to a larger predetermined diameter.

A novel combination of mechanisms is used to expand the formed primary strap loop to a larger loop of predetermined diameter. With the cup 28 in the lowered position as illustrated in FIGS. 9 and 10, slide cover 62, anvil 44 and polyurethane pad 48 move closer toward weld head 52 by slide 46 under the influence of a biasing means described hereinafter. Anvil 44 is moved forward to force polyurethane pad 48 against the strap loop in a region where the strap free end 38 overlaps the overlapped portion of the loop formed by the length of strap 36. The polyurethane pad 48 then contacts a side of the length of strap 36 to force both the length of strap 36 and the overlapping strap free end 38 against weld head 52. By means that will be described later, the polyurethane pad 48 is maintained against the loop with a relatively small amount of force such that the strap free end 38 is restrained from moving by the weld head roughened peripheral gripping surface 54. However, the force is low enough (about 2 pounds) to permit the overlapped length of strap 36 to slide forward between the strap free end 38 and the smooth-surfaced polyurethane pad 48 when the length of strap 36 is fed to expand the loop. Preferably, during the expansion of the primary strap loop, the surface of shoulder 26 provides the support for the bottom of the strap loop as it expands.

Though the surface 54 of the weld head 52 is preferably roughened (especially on account of its gripping function during the subsequent friction fusion process to be described below), it need not necessarily be so. Insofar as the head 52 functions during the loop expansion process, the head 52 need only have some sufficiently relatively greater coefficient of sliding friction than the pad 48. Alternatively, the pad 48 could be replaced by a cylindrical roller mechanism which would rotate about an axis parallel to the weld head shaft 53 to allow feeding and tensioning of the strap. The roller could be locked against rotation, if necessary, during the subsequent friction fusion process (to be described below).

Figure 4:
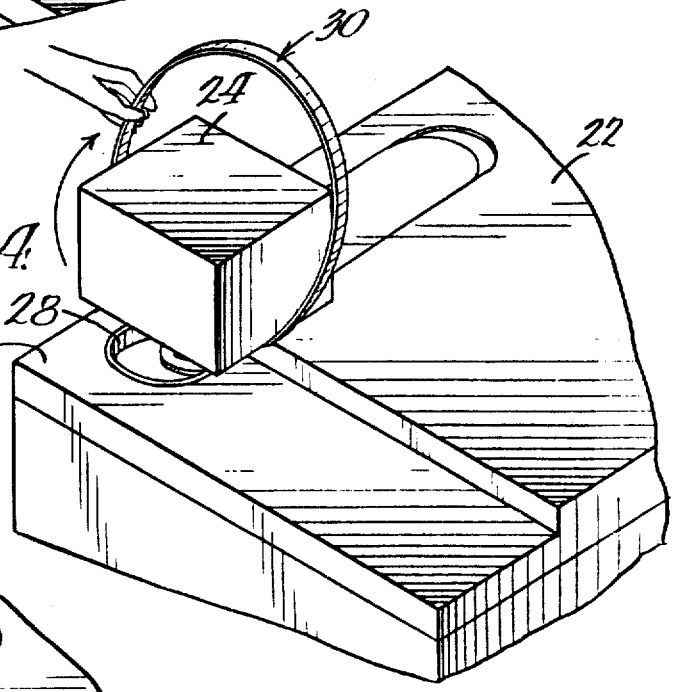
FIG. 4 is a partial perspective view similar to FIG. 3 showing the expanded strap loop being located about the package.
Figure 5:
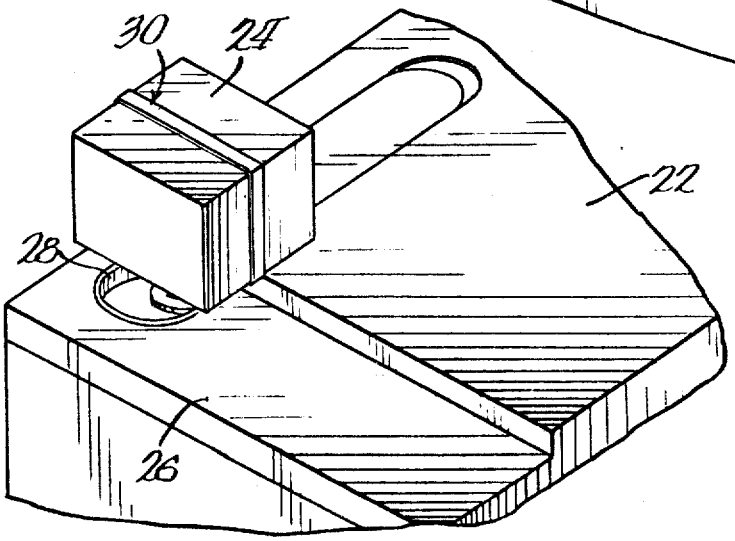
FIG. 5 is a partial perspective view similar to FIG. 4 showing the strap loop tensioned about the package.
Figure 11:
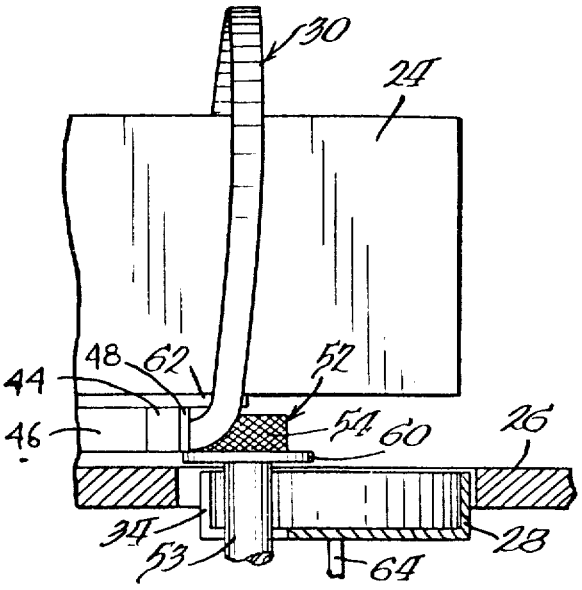
FIG. 11 is a sectional view similar to FIG. 10 showing the expanded loop located about a package.

After the loop has been expanded to the predetermined larger diameter and placed around the package 24 as shown in FIGS. 4 and 11, the loop 30 is tensioned and tightened about the package 24. The details of the mechanism for applying tension to the strap will be discussed later. It is first necessary to describe the action of the polyurethane pad 48 and the weld head 52 during the tensioning process. At the beginning of the tensioning phase, the strap loop 30 is disposed about the package 24 as illustrated in FIG. 11. At this time, the cup 28 is in the lowered position below the surface of the shoulder 26. The strap loop 30 is tensioned about the package 24 to form a tight loop as illustrated in FIG. 5. During tensioning, a tensile force is transmitted along the length of the strap 36 which is considerably higher than the small compressive force which exists in the portion of the strap between the strap feed mechanism and the polyurethane pad 48 as the strap is being fed to form the expanded loop. Consequently, during tensioning the higher force occurring in the strap would tend to pull the strap free end 38 from its restrained engagement against weld head 52. To overcome this possibility, the polyurethane pad 48 is forced against the strap and weld head 52 during tensioning with a large force to cause strap free end 38 to remain restrained against the weld head 52. In the preferred embodiment of the present invention, it has been found that a force of about 30 to 40 pounds is sufficient to maintain the strap free end 38 between the polyurethane pad 48 and the weld head 52 as the overlapped length of strap 36 is tensioned. Typically, the strap loop is tensioned to about 10 to 15 pounds.

During the tensioning process, as illustrated in FIG. 11, the upper edge of the strap, in the region of the strap overlap between the polyurethane pad 48 and the weld head 52, is nearer the bottom surface of the package 24 than is the bottom edge of the strap. Preferably, the strap loop 30 is maintained in the 90° twist orientation illustrated in FIG. 11 such that both the upper and lower edges of the strap in the region between the polyurethane pad 48 and the weld head 52 are located in the plane of the loop as the loop is tensioned about the package 24. Although the sliding surface of polyurethane pad 48 and the opposed gripping surface 54 of weld head 52 are shown in FIG. 11 as being perpendicular to the slide cover 62 and to the bottom of the package 24, such orientation is not necessarily required. The surfaces on both the polyurethane pad 48 and the weld head 52 could be angled with respect to the plane of the strap loop 30 about the package 24.

During the tensioning process, slide cover 62 lies between the bottom surface of package 24 and the strap loop 30. With some types of soft packages and at certain high tension levels, the slide cover 62 serves to prevent the loop 30 from pulling out of engagement from between the polyurethane pad 48 and the weld head 52. After tensioning, when the slide cover 62 is removed from between the package 24 and the loop 30 as will be described hereinafter, a certain amount of slack is thus present in the tightened loop. However, due to the elasticity of the plastic strap and due to the compressibility of the package 24, a tight loop is nevertheless achieved when the slide cover 62 is removed. Additionally, the slide cover 62 can be made relatively thin (in the vertical direction as viewed in FIG. 11) and can be made relatively narrow with respect to the package width (as viewed in the horizontal direction in FIG. 2) to minimize the amount of slack formation. Further, with certain types of packages (such as those having rather rigid and incompressible surfaces), and with low loop tensions, the slide cover 62 can be eliminated altogether. This is because, at low tension levels, the strap loop has less of a tendency to be pulled out of engagement from between the polyurethane pad 48 and the weld head 52. Further, the relative incompressibility of the package 24 would prevent the strap loop 30 from sinking into the package and pulling away from the polyurethane pad 48 and the weld head 52.

Although the tensioning process is illustrated in FIG. 11 as occurring with the overlapped portions of the strap loop oriented in a plane parallel to the plane of the strap loop about the package, the loop 30 could be tensioned in other orientations. With very large packages and with very small weld head diameters, it would be possible to insert the package into the expanded loop when the loop is in the horizontal position as shown in FIG. 3. Then the loop could be tensioned in that horizontal configuration. Though the diameter of the weld head 52 would create some amount of slack in the tensioned loop, with large compressible packages such slack would be negligible and would not affect the integrity of the tightened loop. If the strap loop was to be tensioned about the package in the horizontal direction, then the upper surface of shoulder 26 would advantageously be located at a lower elevation with respect to the weld head 52 and the strap transport zone 40 than is shown in FIG. 6. The increased depth would accommodate placement and insertion of large packages within the horizontally oriented loop. Of course, if the loop were to be tensioned in the horizontal direction, provisions could also be made for automatically withdrawing the weld head 52 from between the strap and the package after the tensioning process has been completed.

STRAP FEED AND TENSIONING MECHANISM

The strap is both fed and tensioned by one traction wheel assembly. A traction wheel 68 and adjacent idler wheel 70 are mounted for horizontal rotation in the strap transport zone 40 as illustrated in FIG. 6. The idler wheel 70 is preferably spring-biased against the traction wheel 68. The strap 36 is threaded in the guideways 42 and between the traction and idler wheels 68 and 70, respectively. Traction wheel 68 is mounted on a shaft 72 and is rotatably drivable in either direction by an electric motor 76 which is connected to the shaft by a conventional drive belt 78. The motor can drive the traction wheel 68 first clockwise (as viewed in FIG. 6) to feed the strap to form the loop and then counterclockwise (as viewed in FIG. 6) to tension the loop.

A bulk supply of strap is preferably wound on a conventional self-supporting spool (not shown) which can be placed near the apparatus 20 and which rotates to deliver strap in response to the feed force of the traction wheel pulling on the strap.

On the end of the shaft 72 opposite the traction wheel is an incremental rotation control unit 74 which signals the cup solenoid actuator 66 to lower cup 28 after the primary strap loop has been formed. Control unit 74 is of a conventional type which incorporates an electrically actuated clutch. When the clutch is actuated, a cam member rotates with the shaft 72 for one revolution, after which the clutch disengages the cam member from the shaft 72 and locks the cam against further rotation. The cup solenoid actuator 66 is de-energized to lower the cup 28 by a limit switch provided in the control unit 74 and which is actuated by the rotating cam after one rotation of the cam. In order that a single rotation of the traction wheel 68 causes the primary strap loop to be formed within the cup 28 with the strap free end overlapping a portion of the loop, the diameter of the traction wheel 68 is larger than the diameter of the cup 28.

After formation of the primary strap loop in the cup 28, cup 28 is lowered away from the loop allowing the traction wheel 68 to expand the loop to a predetermined size. Actually, since the cup 28 is lowered quite rapidly by the solenoid actuator 66, it is not necessary to terminate the strap feeding process while the cup 28 is being lowered. Thus, the strap is continuously fed without interruption until the desired expanded loop diameter is achieved.

Figure 12:
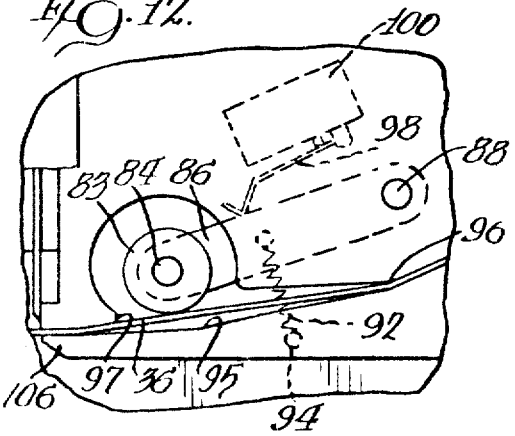
FIG. 12 is an enlarged, partial top view of the apparatus shown in FIG. 6 showing in detail the strap tension sensing mechanism.

The tensioning process is terminated when the desired level of loop tension is sensed. A tension sensing assembly is provided in the strap transport zone 40 and is illustrated in FIGS. 7, 9 and 12. A tension sensing wheel 83 is rotatably mounted about shaft 84 on arm 86. Arm 86 is pivotally mounted about shaft 88 to frame plate 90. Spring 92 is secured on one end to arm 86 and on the other end to an anchor 94 in the frame. The spring 92 functions to pivot arm 86 counterclockwise about shaft 88 to bias the tension sensing wheel 83 against the side wall region 95 in strap transport zone guideway 42. The tension of spring 92 is adjustable and can be set to permit a given amount of spring extension at a predetermined strap tension level. When the strap is under little or no tension, the strap length 36 is forced by the wheel against the side wall region 95 in guideway 42 as illustrated in FIGS. 7 and 9. As the tension increases, the strap length 36 forces wheel 83 out from the wall region 95 because the tensioned strap 36 is drawn into a straight line between point 96 and point 97 in guideway 42. The present spring tension is set so that the strap length 36 is prevented from forming a straight line between points 96 and 97 until the strap tension reaches the predetermined level. When the predetermined strap level is reached, the tension sensing wheel 83 is forced by the straight portion of strap length 36 to the position illustrated in FIG. 12 where the arm 86 bears against contact arm 98 of a limit switch 100. Actuation of the limit switch 100 in this manner opens the circuit of motor 76 to terminate the tensioning.

STRAP LOOP FRICTION FUSION MECHANISM

The method and mechanism for connecting the strap free end 38 to the overlapped portion of the length of strap 36 will now be described. If a plastic or plastic-coated metal strap is used, a welded or friction-fused joint can be achieved by heating the overlapped region of the loop.

In the preferred embodiment, the fusion heat is generated by rapidly moving the strap free end 38 against the overlapped portion of the length of strap 36 to generate heat by friction and effect interface melting therebetween. More particularly, this is accomplished by oscillating the weld head 52 with a relatively small angular rotation at a sufficiently high frequency. Weld head 52 is rotatably oscillated about the shaft 53 so that the peripheral gripping surface 54, being engaged with a side of the strap free end 38, causes the strap free end 38 to be moved back and forth with respect to the stationary overlapped portion of the length of strap 36. Typically, the frequency of oscillation is between about 50 and 100 hertz, the total amplitude of circumferential rotation of the gripping surface 54 is about 0.15 inch, and the [oscillation period lasts from] *oscillations last for a period of time of* between 0.75 [to] *and* 1.0 second. In order to insure an adequate weld, the polyurethane pad 48 is pressed against the overlapped portion of the length of strap 36 with a higher force than is used during the tensioning process. Typically, a force of about 100 pounds is impressed against the strap during the friction-fusion process.

The weld head 52 is driven in the oscillatory mode by motor 80 and a connected oscillating drive tranmission 82. The motor 80, transmission 82, and control means (not shown) are well known and commerically used in present friction fusion strapping machines. A description of such mechanisms can be found in the U.S. Pat. No. 3,586,572, to Ericsson.

The friction fusion joint could be formed with a different type of anvil apparatus than illustrated. For example, pad 48 could be replaced with a cylindrical roller mounted for rotation about an axis parallel to the weld head shaft 53 and having a roughened gripping surface. The rotation of the roller would allow for the feeding and tensioning of the strap. Then after the loop had been tensioned, the roller could be oscillated vertically (along its axis) by a suitable mechanism to vibrate the strap 36 against the free end 38 to create a fused joint.

After the friction-fusion joint has been completed, the cup 28 is still maintained in the lowered position below the surface of shoulder 26 while the weld head 52 and the polyurethane pad 48 are maintained in compressive engagement on the strap loop so that the strap loop can be severed from a standing portion of the strap length 36 as will be next described in detail.

STRAP SEVERING MECHANISM

After the loop has been connected by the friction-fusion weld, the standing portion of the strap is severed from the loop by cutter 102 as best illustrated in FIGS. 6 and 9.

The cutter blade 102 is fixed in a slide block 104 which is slidably mounted for movement toward and away from strap [37] *36* as best shown in FIG. 9. A cutter block [196] *106* is provided to guide strap 36 to prevent the strap from deflecting away from the cutter blade 102 as it is moved forward to sever the strap.

The cutter blade 102 is moved through a linkage by a pneumatic cylinder actuator 114. As illustrated in FIG. 6, link 108 is pivotally mounted about shaft 110 and is pivotally connected to arm 112 on one end and to [cutter] *slide* block [106] *104* on the other end. Arm 112 is connected to the cutter air cylinder actuator 114 through a conventional cylinder piston rod (not shown). Pressurization of the cylinder actuator 114 forces the cylinder piston rod and arm 112 toward the cylinder actuator to pivot link 108 counterclockwise (as viewed in FIG. 6) about shaft 110 thereby moving the cutter blade 102 forward to sever the strap. The cylinder actuator is equipped with an internal spring to return the piston rod to the extended position (and hence the cutter blade 102 to the retracted position) upon release of cylinder air pressure.

After the strap has been severed, the anvil slide 46 is moved away from the weld head 52 to retract the anvil 44 and the slide cover 62. With the anvil 44 retracted, the fused portion of the strap loop adjacent the weld head 52 is relieved from its 90° twist configuration with respect to the balance of the loop and lies flat along the bottom surface of the package. Since the slide cover 62 is also retracted, the tensioned strap loop tightens further, under influence of its elasticity, to fit tight around a portion of the surface of the package that was previously in contact with the slide cover 62. The strapped package can then be removed from the apparatus.

PNEUMATIC ACTUATION SYSTEM

As previously described, the movement of cutter blade 102 and anvil slide 46 is effected by pneumatic cylinder actuators 114 and 120, respectively. The actuators are controlled by a pneumatic actuation system illustrated schematically in FIG. 13.

The system is comprised of a supply manifold 124 supplying 90 psi air to three pressure regulating valves 126, 128, and 130 downstream of which are three-way electrically operated solenoid valves 132, 134, and 136, respectively. The solenoid valves admit air to a distribution manifold 137 for supplying the cylinder actuators 114 and 120. A check valve 138 prevents flow from solenoid valves 132 and 134 from pressurizing the cutter cylinder actuator 114. Cylinder actuator 114 can thus be pressurized only from solenoid valve 136 through a flow control valve 139.

Pressure regulating valves 126, 128, and 130 are set to control pressure to relative "low", "medium", and "high" pressure levels, respectively, for purposes to be explained hereinafter. The solenoid valves 132, 134, and 136 each have three ports (labeled A, B, and C in FIG. 13). Exhaust port C is plugged in valves 134 and 136, but is unplugged to exhaust to atmosphere in valve 132. In the de-energized state, the solenoid valves are set to pass flow through ports B and C (except that port C is plugged on valves 134 and 136) and in the energized state the valves pass flow through ports A and B.

Figure 13:
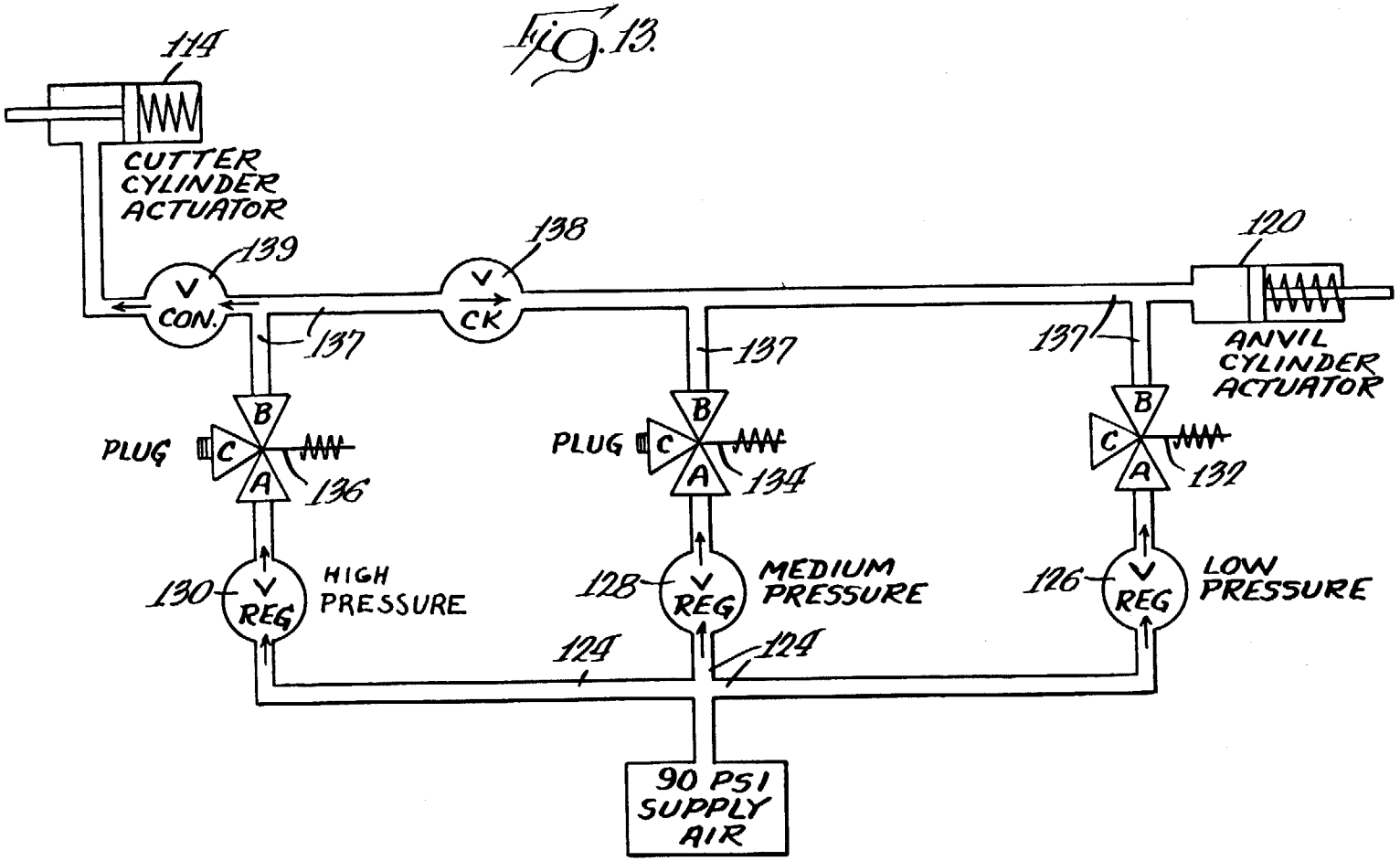
FIG. 13 is a schematic diagram of the pneumatic control system for the apparatus of the present invention.

The actuation of the anvil cylinder actuator 120 will now be considered. When the primary strap loop is first formed in cup 28, the anvil 44 is moved forward to contact abutment surface 56 as illustrated in FIG. 7. With reference now to FIG. 13 also, it can be seen that movement of anvil 44 to this position is accomplished by actuating air solenoid valve 132 to open ports A and B to allow a regulated low air pressure from pressure regulating valve 126 to act upon the piston in cylinder actuator 120 and force anvil 44 against the cup abutment surface 56 with about 2 pounds of force. The 2 pounds of force is a nominal amount that is used to insure that the anvil 44 is abutting the cup 28 to provide proper alignment and guiding of the strap free end 38 as it is fed forward into aperture 34 and between polyurethane pad 48 and weld head 52.

After the primary strap loop has been formed in cup 28, cup 28 is lowered to below the surface of shoulder 26. As cup 28 is being lowered, cup abutment surface 56 slides vertically downward along the front of anvil 44. As soon as cup 28 has cleared the bottom of anvil 44, anvil 44 is urged forward against the strap and weld head 52 by the 2 pounds of force that is still maintained by the anvil air cylinder actuator 120. The loop is expanded to a larger diameter with the anvil 44 maintaining the 2 pounds of force on the strap. Next, after the expanded loop has been located around the package, a higher pressure must be applied to the overlapped portions to prevent the strap free end 38 from being drawn out of engagement with weld head 52, during the tensioning step. Thus, at this point, solenoid valve 134 is energized to open port A to provide medium pressure air to anvil air cylinder actuator 120 to cause the anvil 44 to exert about 30 to 40 pounds on the strap against the weld head 52. After the tensioning process has been completed, the solenoid valve 134 is de-energized to close port A. However, since port C is plugged, the cylinder actuator 120 remains pressurized and the anvil 44 remains pressed against the strap loop.

During the next joint-forming step, the strap must be held with even more force against the weld head 52 as the weld head 52 is oscillated at high frequency to form the friction-fused joint. To accomplish this, the solenoid valve 136 is energized to open port A to admit higher pressure air to anvil air cylinder actuator 120 to force anvil 44 against the strap and weld head 52 with about 100 pounds of force.

The cutter air cylinder actuator 114 is supplied with high pressure air from high pressure regulator 130 only through solenoid air valve 136 since check valve 138 prevents air from low and medium pressure regulators 126 and 128 from flowing into the cutter air cylinder actuator 114. Note that solenoid air valve 136 admits air to both the anvil air cylinder actuator 120 and the cutter air cylinder actuator 114 simultaneously. However, the action of the cutter air cylinder actuator 114 is delayed about one-half second while the high pressure air is admitted to the anvil air cylinder actuator 120 to hold the strap until completion of the friction-fusion welding. After the weld is completed, the cutter air cylinder actuator 114 is permitted to move the cutter blade to sever the strap. This is accomplished by the flow control valve 139 in the air supply line to cutter air cylinder actuator 114. The flow control valve 139 provides a controlled slow rate of pressurization and, acting through the cutter air cylinder actuator 114, moves the cutter blade 102 forward so that it reaches the strap length 36 (FIG. 12) just as the weld sequence is terminated. After the cutter blade 102 has severed the strap and reached the full extent of its travel, solenoid valve 136 is de-energized to close port B and solenoid valve 132 is de-energized to close port A and open port C to exhaust air pressure from both the cutter air cylinder actuator 114 and the anvil air cylinder actuator 120. The internal spring return mechanisms in each of the cylinders causes anvil 44 and cutter blade 102 to return to the fully retracted positions.

ELECTRICAL CONTROL SYSTEM

Figure 14:
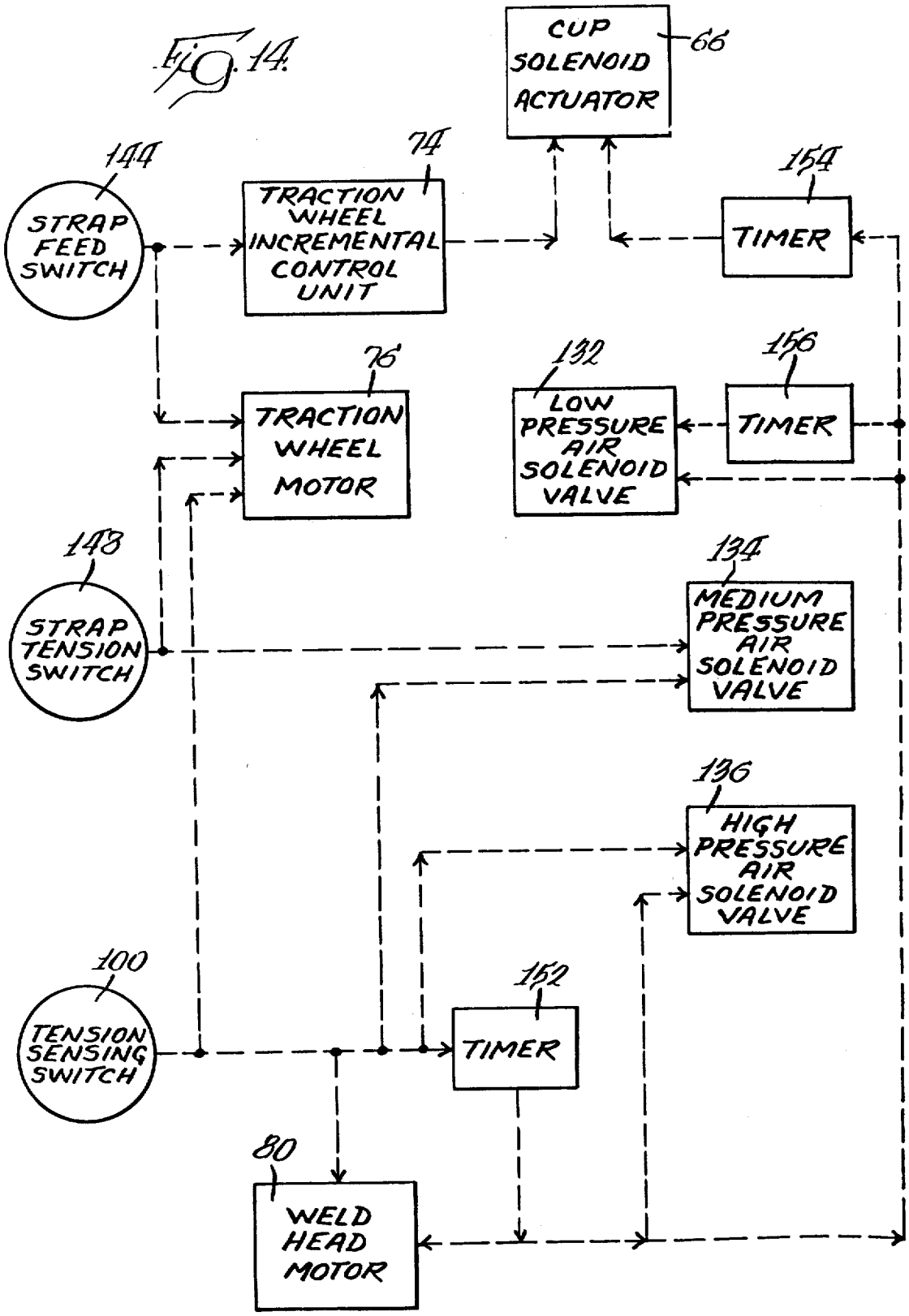
FIG. 14 is a simplified control block diagram for the apparatus of the present invention.

In order that the strap loop be properly formed, expanded, tensioned, friction-fused, and severed, the sequence of operation must be appropriately controlled. The operation of the apparatus 20 of the present invention can be made to operate automatically and rapidly by means of a suitable electrical control system. A suitable control system is illustrated in the simplified control block diagram of FIG. 14. In the diagram, the necessary interlocking latching relays and switches are omitted. It is assumed that apparatus is at the beginning of a strapping cycle in a power-on ready mode with the strap threaded in the guideways 42 up to the cutter block 106. The cup 28 is in the raised position by the energized solenoid actuator 66. The solenoid valve 132 is energized to pressurize the anvil cylinder actuator 120 to move the anvil 44 against the cup 28 (as shown in FIG. 7) with about 2 pounds of force. The field coils of the traction wheel motor 76 are energized for motor operation in the direction to feed the strap into the cup 28.

A strap feed switch 144 is provided and is preferably a foot-operated momentary contact type. When depressed, the feed switch 144 energizes the armature of the traction wheel motor 76 to turn the motor in the direction to feed the strap. The feed switch 144 also actuates the incremental control unit 74 associated with the traction wheel shaft 72 to lower the cup 28 after the primary strap loop is formed. As the cup 28 is lowered, the motor is still rotating so that the strap continues feeding. As the cup reaches the lower position beneath the surface of the shoulder 26, the anvil 44 is urged against the strap to force the strap against the weld head 52 under the influence of the low pressure air being supplied to anvil cylinder actuator through the solenoid valve 132. The anvil 44 bears against the strap and the weld head 52 with about 2 pounds of force as the loop continues to expand. Release of the feed switch 144 stops the motor 76 and stops the strap feed. Repressing of the feed switch 144 continues the feeding of strap and expansion of the loop.

When the loop is of sufficient size, the operator releases the feed switch 144. Alternatively, if identically sized packages are being strapped on a production line basis, the feeding of the strap and expansion of the loop could be controlled by a timer. In any case, the operator next lifts the loop and places it over the package as illustrated in FIG. 4.

A strap tension switch 148 is provided to reverse the motor 76 to tension the loop about the package. The tension switch 148 is preferably a foot-operated momentary contact type. The tension switch 148 is also connected to actuate the solenoid valve 134 to admit medium pressure air to the anvil air cylinder actuator 120 to move the anvil 44 against the strap loop and the weld head 52 with about 40 pounds of force. This holds the strap free end 38 against the weld head 52 while the overlapping portion of the strap loop is allowed to slide against the anvil 44 as the loop is tensioned.

When the predetermined strap loop tension level (about 10 to 15 pounds on small packages) is reached, the tension sensing switch 100 is actuated to stop the motor 76 and reverse the motor field coils for the next cycle operation in the feed direction. The tension sensing switch 100 also de-energizes the medium pressure solenoid valve 134 and energizes the solenoid valve 136 supplying the high pressure to the anvil cylinder actuator 120 and the cutter air cylinder actuator 114. This causes (1) the anvil actuator 120 to provide the high clamping force (approximately 100 pounds) required to hold the overlapped strap portion of the loop while the friction-fusion joint is made and (2) the cutter actuator 114 to move the cutter blade 102 to sever the strap after conclusion of the joint weld. The tension-sensing switch also actuates the weld motor 80 and the timer 152 which de-energizes the weld motor after the weld has been completed (about ¾ of a second to 1 second). the timer 152 also de-energizes the solenoid valve 136 thereby blocking the high pressure air supply and de-energizes the solenoid valve 132 to exhaust to atmosphere so that both the cutter air cylinder actuator 114 and the anvil air cylinder actuator 120 are returned by their internal spring mechanisms to the positions wherein the cutter blade [120] *102* and the anvil 44 are in the fully retracted positions.

To set the apparatus for the next cycle, timer 152 also energizes two additional timers, 154 and 156. Upon timing out, timer 154 energizes solenoid actuator 66 to raise cup 28 and timer 156 energizes solenoid valve 132 to move the anvil 44 forward to abut the cup 28. Timer 154 is set to provide a certain time period for removal of the strapped package before raising the cup 28. Timer 156 is set to provide a period longer than timer 154 to assure that the cup 28 will be in the raised position when the anvil 44 is moved forward.

While preferred construction features of the invention are embodied in the structure illustrated herein, it is to be understood that the changes and variations may be made by those skilled in the art without parting from the spirit and scope of the appended claims.

I claim:

1. [An] *In an* apparatus for forming, tensioning, and securing a strap loop about a package, said apparatus comprising:

means for [feeding] *guiding* a length of strap [in a path] to form a primary strap loop with a portion of the strap loop overlapped by the free end of the length of strap;

means for restraining said free end of the strap from movement while feeding the standing length of the strap to expand the loop to a predetermined size;

means for tensioning the strap to tighten the loop about said package; and means for joining said free end of the strap and an adjacent overlapped portion of the loop;

*the improvement in the apparatus characterized in that said means for guiding the strap to form a primary loop is free of guides for acting on the inside of the loop but includes an arcuate guide member having an inner surface for acting on the outside of the loop for guiding only one surface of the strap along the inner surface of the guide member to form said primary strap loop, said guide member defining a slot and being positionable to receive said length of a strap through said slot, said slot being open to one edge of said guide member; the improvement further characterized in that said guide member is movable relative to said restraining means; and the improvement further characterized in that said apparatus includes means for moving said guide member relative to said restraining means between a first position wherein said primary strap loop is formed and a second position spaced away from said first position to allow said primary strap loop to be expanded to said predetermined size out of contact with said guide member.*

[2. The apparatus in accordance with claim 1 in which said means for feeding said length of strap in a path to form a primary loop includes a guide member for guiding said length of strap in a closed path.]

[3. The apparatus in accordance with claim 1 in which said means for feeding said length of strap in a path to form a primary loop includes a circular band member having a slot, said band member being positioned to receive said length of a strap through said slot and being designed to guide the strap along the inner surface of the band to form said primary strap loop.]

[4. The apparatus in accordance with claim 3 in which said slot is open to one edge of said band member and including means for moving said band member between a first position wherein said primary strap loop is formed and a second position parallel to, and spaced away from, said first position to allow said primary strap loop to be expanded to said predetermined size out of contact with said band member.]

5. The apparatus in accordance with claim 1 in which said means for restraining said free end of the strap comprises a rough-surfaced member adapted for bearing against a side of said free end to engage said free end between said rough-surfaced member and an adjacent overlapped portion of the loop while the standing length of the strap is fed to expand the loop.

[6. An apparatus for forming, tensioning, and securing a strap loop about a package, said apparatus comprising:

a frame having means for supporting a length of strap;

means for feeding a length of strap;

guide means for receiving a free end of said length of strap and for guiding said free end in a path to form a primary strap loop with a portion of the strap loop overlapped by said free end;

means for restraining said free end of the strap from movement while feeding the standing length of the strap to expand the loop to a predetermined size;

means for tensioning the strap to tighten the loop about said package; and means for joining said free end of the strap and an adjacent overlapped portion of the loop.]

[7. The apparatus in accordance with claim 6 in which said guide means is a hollow, substantially cylindrical member having a slot for passing said length of strap from the exterior of said cylindrical member to the interior of said cylindrical member.]

[8. The apparatus in accordance with claim 7 in which said slot is open to one end of said cylindrical member and including means for moving said cylindrical member between a first position wherein said primary strap loop is formed and a second position spaced away from said first position to allow said primary strap loop to be expanded to said predetermined size out of contact with said cylindrical member.]

[9. The apparatus in accordance with claim 6 in which said means for feeding said strap includes a rotatably mounted traction wheel positioned to bear against said strap and drive means for rotating said traction wheel.]

10. The apparatus in accordance with claim [6 in which said strap is one of non-metallic and] *1 adapted for use with strap that is either a thermoplastic material or a* metallic *material* with a [non-metallic] coating [and] *of thermoplastic material;* in which said means [for forming a connection comprises] *for restraining and said means for joining include at least* a rough-surfaced gripping member rotatably mounted on said frame, *an anvil, and* means for effecting relative movement between said anvil and said gripping member to [compress] *press* said strap free end and an adjacent overlapped portion of the loop therebetween and to place said strap free end and the adjacent overlapped portion of the loop in frictional engagement[,]; and *in which said means for joining further includes* means for oscillating said gripping member to produce bodily sliding frictional movement of said strap free end against the adjacent overlapped portion of the loop to effect interface melting therebetween, whereby said strap free end is fused to the adjacent overlapped portion of the loop.

[11. The apparatus in accordance with claim 6 in which said means for restraining said free end of the strap comprises a rough-surfaced member and an opposed smooth-surfaced member for pressing said free end of the strap and an adjacent overlapped portion of the loop therebetween.]

12. The apparatus in accordance with claim [11 including] *10 in which said* means for *effecting relative movement includes means for* moving said [smooth-surfaced member] *anvil* to bear against a side of an adjacent portion of the loop in contact with said strap free end whereby a side of said strap free end is pressed against said rough-surface *gripping* member.

13. The apparatus in accordance with claim [11] *10* further comprising strap edge locator means for guiding at least one of the two edges of a portion of the length of strap as the strap is fed.

14. The apparatus in accordance with claim 13 in which said strap edge locator means comprises a plate mounted adjacent said [smooth-surface member] *anvil* and substantially parallel to the plane of said primary strap loop.

15. The apparatus in accordance with claim 13 in which said strap edge locator means comprises a flange on one end of said rough-surfaced *gripping* member.

16. An apparatus for forming, tensioning, and securing one of a non-metal strap and a metal strap with a non-metal coating in a loop about a package, said apparatus comprising:

a frame having a package support surface;

means for supporting a length of strap on edge in a strap transport zone below said package support surface;

a motor driven traction wheel and adjacent idler wheel located in said strap transport zone and adapted for engaging said length of strap therebetween for feeding said length of strap in one direction for forming a loop and for drawing said length of strap in the reverse direction to tension said loop;

a cylindrical weld head located in said strap transport zone with the axis parallel to the sides of the strap in said zone and having a peripheral gripping surface adapted for contacting a side of said strap;

a smooth-surfaced anvil [member] located adjacent said weld head in said strap transport zone;

means for moving said anvil in said zone towards said weld head to engage portions of the strap therebetween;

a hollow cylindrical guide in said strap transport zone surrounding said weld head and having slot means for accommodating said movement of said anvil [member] towards said weld head and for accommodating the passage of said length of strap between said anvil and said weld head from the exterior to the interior of said guide when said length of strap is fed into said guide to form a primary strap loop with a portion of the strap loop overlapped by the free end of the strap, said guide being moveable between a first position in alignment with said strap transport zone and a second position, below the first position, wherein said primary strap loop can be expanded to a larger loop of predetermined diameter when said free end of the strap is pressed between said weld head gripping surface and an adjacent overlapped portion of the loop by said smooth-surfaced anvil;

means connected to said cylindrical weld head for oscillating the head at a frequency sufficiently high to fuse said free end of the strap to an adjacent overlapped portion of the loop *after the larger strap loop has been placed around said package and tensioned;* and cutter means for severing the standing portion of the length of strap from the [tightened] *tensioned* and fused loop.

17. The apparatus in accordance with claim 16 including control means responsive to the rotation of said traction wheel for moving said cylindrical guide from said first position to said second position after formation of said primary strap loop in said guide.

18. The apparatus in accordance with claim 17 in which said traction wheel is secured to a shaft and in which said control means includes a clutch member engageable with said shaft.

19. The apparatus in accordance with claim 16 in which said means for moving said anvil includes an air operated piston and cylinder actuator.

20. The apparatus in accordance with claim 18 including automatically actuated valve means for variably pressurizing said piston and cylinder actuator to bias said anvil [member] with variable force against said weld head with portions of strap impressed therebetween.

[21. An apparatus for forming, tensioning, and securing a strap loop about a package, said apparatus comprising:

means for forming a primary strap loop with a portion of the strap loop overlapped by the free end of the length of strap;

means for restraining said free end of the strap from movement while feeding the standing length of the strap to expand the loop to a predetermined size;

means for tensioning the strap to tighten the loop about said package; and means for joining said free end of the strap and an adjacent overlapped portion of the loop.]

*22. In an apparatus for forming, tensioning, and securing a thermoplastic strap in a loop about an article; means for feeding a length of strap to form a primary strap loop; means for expanding the loop to a predetermined size; means for tensioning the loop about the article; and means for connecting the overlapping strap loop ends; the improvement that includes:*

*a weld head having a peripheral gripping surface adapted for contacting a side of the strap;*

*a generally smooth-surfaced anvil located adjacent said weld head;*

*means for moving said anvil away from said weld head to permit passage of the free end of said strap past said anvil and for moving said anvil towards said weld head to engage portions of the strap therebetween with a predetermined force;*

*an arcuate guide member substantially surrounding said weld head, said guide member having slot means for accommodating the movement of said anvil towards said weld head and for accommodating the passage of said length of strap between said anvil and said weld head from the exterior to the interior of said guide member when said length of strap is fed into said guide member to form a primary strap loop with a portion of the strap loop overlapped by the free end of the strap, said guide member being movable between a first position for receiving said strap while forming said primary strap loop and a second position spaced from the first position wherein said primary strap loop can be expanded without interference to a larger loop of predetermined size when said free end of the strap is pressed between said weld head gripping surface and an adjacent overlapped portion of the loop by said smooth-surfaced anvil; and*

*means connected to said weld head for oscillating said weld head at a frequency sufficiently high to fuse said free end of the strap to an adjacent overlapped portion of the loop.*

*23. The apparatus in accordance with claim 22 in which said apparatus includes a traction wheel and motor drive means for rotating said traction wheel in one direction to feed said strap and thereby function as said feeding means and for rotating said traction wheel in the opposite direction to withdraw said strap to apply tension to the loop and thereby function as said tensioning means.*

* * * * *